Oct. 11, 1955     J. J. FURST     2,720,116
UNIVERSAL GYRO VERTICAL
Filed April 14, 1952     2 Sheets-Sheet 1
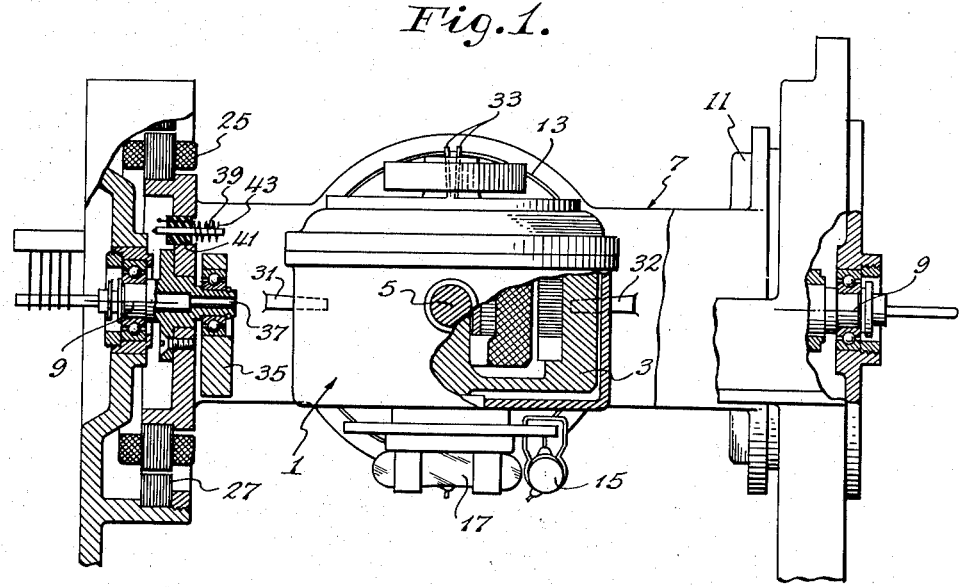
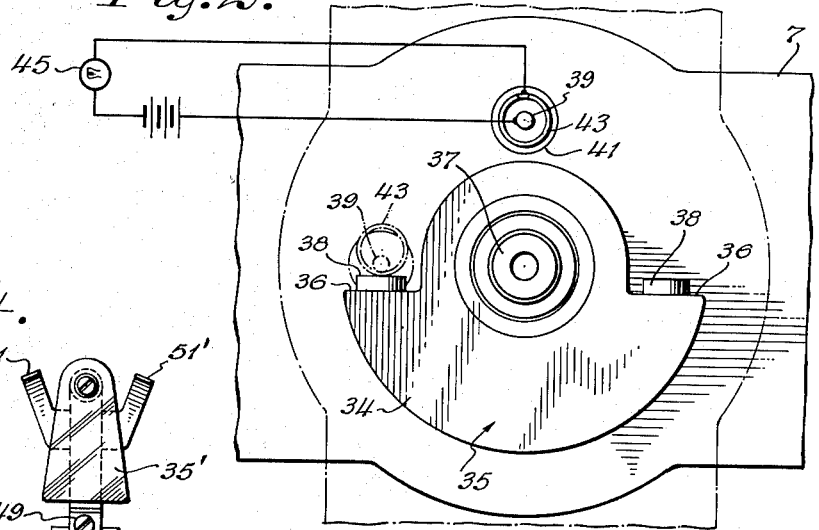
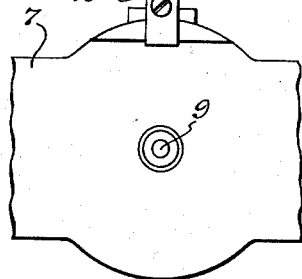
INVENTOR
JOHN J. FURST
BY
Herbert H. Thompson
his ATTORNEY.

Oct. 11, 1955  J. J. FURST  2,720,116
UNIVERSAL GYRO VERTICAL

Filed April 14, 1952  2 Sheets-Sheet 2

INVENTOR
JOHN J. FURST
BY
Herbert H. Thompson
his ATTORNEY.

United States Patent Office 2,720,116
Patented Oct. 11, 1955

2,720,116

UNIVERSAL GYRO VERTICAL

John J. Furst, Mineola, N. Y., assignor to Sperry Rand Corporation, a corporation of Delaware Application April 14, 1952, Serial No. 282,220

16 Claims. (Cl. 74—5.42)

This invention relates to erection devices for gyro verticals or gyroscopic horizons and has special application to gyro verticals for aircraft in which the relative angles between the gyro and craft may exceed 90 degrees. The great majority of gyro verticals today are equipped with an erection system comprising a gravitationally responsive device or devices, such as auxiliary pendulums, rolling balls or liquid levels which control torque applying devices acting at right angles to the tilt. Such gravitational devices, however, usually produce the proper signal for tilt angles up to about or not greatly exceeding 90 degrees, beyond which the signal produced by the device becomes unreliable and indeterminate. Therefore, if the gyro happens to be started up when it is inclined to the horizontal through a large angle, it will not erect itself. Also, if for any reason the gyro becomes tumbled or dumped during acrobatic maneuvers, the above-described type of gravitational device will not be effective to erect it. Hence, in the past, such gyroscopes have usually been equipped with caging devices to lock or to reset them under such conditions.

To overcome the above defects in a simple manner, I propose with my invention to provide an auxiliary erection system which is effective, and preferably only becomes effective under the conditions in which the normal erection system becomes inoperative. My invention is especially adapted for the full freedom type of gyro, i. e., one without a cage and in which the position of the spin axis of the gyro is never disturbed by fixed stops. The most popular form of such a full freedom gyro at the present time is characterized by having no stops of any kind about the roll axis of the gyro, but so called high angle stops are employed acting between the gyro and the gimbal ring about the minor or pitch axis. Such stops have been found not to upset or seriously disturb the gyro, but result in the gimbal ring being rotated out of the way of the gyro so that the gyro spin axis cannot pass through the gimbal and thus the gimbal is always kept right-side up with respect to the earth or the gyro. I propose, therefore, to employ my auxiliary erection device only about the roll axis because, as stated, in this type of gyro the gimbal ring cannot become reversed with respect to the gyro.

In the simplest form, my device consists of an auxiliary pendulum pivoted about the fore-and-aft or major axis of the gyro or adjacent thereto and hanging freely with respect to the gimbal ring. If, however, the gimbal ring becomes relatively inclined with respect to the pendulum through an angle approaching or greater than the limiting angle at which the normal erection device is operative, the pendulum will strike a stop on the gimbal by which in effect the gimbal picks up the pendulum so that it thereby becomes pendulous for the time being about its roll axis and hence will tend to move the gimbal back to the position in which the normal erection device will take over, as more fully explained hereinafter.

Referring to the drawings in which two forms of my invention are shown,

Fig. 1 is a side elevation partly in section of a gyro vertical showing my invention applied thereto;

Fig. 2 is an end elevation partly in section of the pendulum and its mount;

Fig. 3 is a detail showing of one of the gravitationally responsive devices which is in the form of a liquid level device;

Fig. 4 is a view similar to Fig. 2 on a smaller scale showing a different mounting for the auxiliary pendulum;

Figure 5:
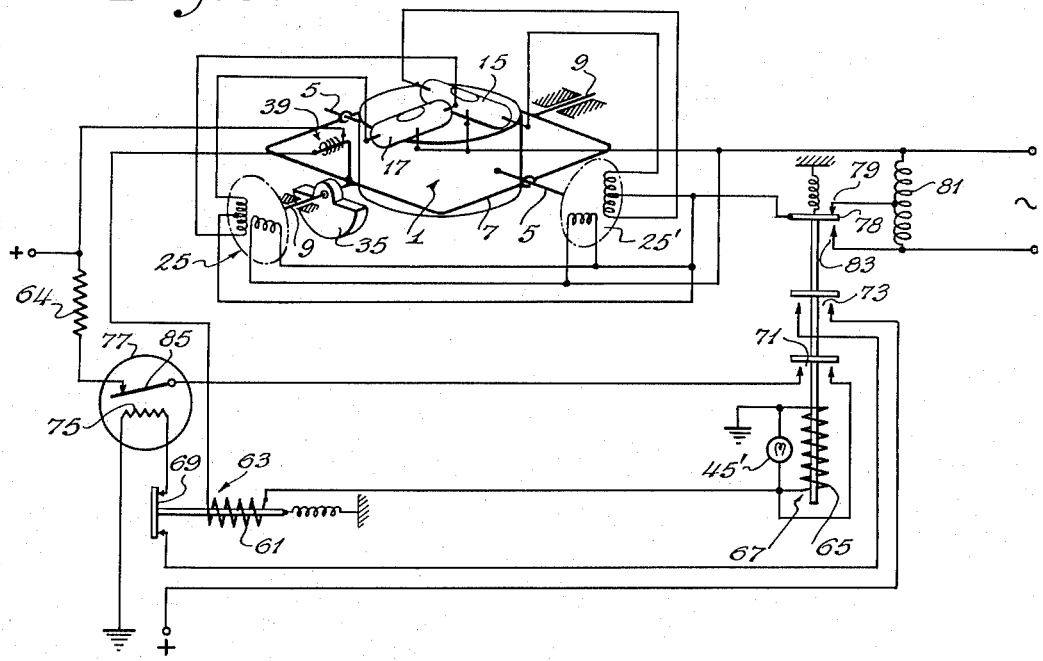
Fig. 5 is a wiring diagram of a modified form of the invention, in which the erecting torques are increased when the tilt of the gyro becomes abnormal.

The particular gyro vertical shown in the drawings comprises a rotor bearing case 1 within which is journaled on a normally vertical spin axis, an electrically spun rotor 3. The rotor case is shown as pivotally mounted on normally horizontal minor axis 5 within a gimbal ring 7 which in turn is journaled on the craft on normally horizontal major axis 9, 9 preferably placed fore and aft on the craft. The axis 9, 9, therefore, is said to constitute the roll axis of the gyro vertical, while axis 5 is the pitch axis. While visual indications of the position of the gyro may be applied directly thereto, in the particular gyro vertical shown, these indications are transmitted to a distance for the operation of remote horizon or vertical indicators or for use as a base line for automatic stabilization of the craft. For this purpose there is shown a transmitter 11 about the roll axis and a transmitter 13 about the pitch axis of the gyro. For normally erecting the gyro vertical, I have shown liquid level devices for acting as the gravitationally responsive controllers, one such device 15 acting about the roll axis and the other 17 about the pitch axis and both being secured to the case 1. The liquid level devices utilized herein may be of the type shown in Kunzer Patent No. 2,367,465, dated January 16, 1945. In such levels, as will be seen from Fig. 3, the non-conducting air bubble 19 which normally partially covers both upper electrodes 21 and 23, leaves but one electrode when the level is slightly inclined. When, however, an angle approaching 90 degrees or greater is reached, the air bubble leaves both electrodes, as shown in the dotted line position of the level, in which condition it will be seen that no effective signal will be transmitted to the torquers controlled by the liquid level. With the liquid level shown, it remains operative up to a tilt of approximately 110 degrees. The liquid level 17 responsive to pitch, for instance, controls the roll axis torquer or torque motor 25 which applies a torque about the roll axis of the gimbal and having a stator 27 fixed to the craft and its rotor to the gimbal ring 7. The roll responsive level 15 on the other hand controls a similar torquer 25', Fig. 5, mounted on the gimbal ring 7 to exert a torque on the gyro about pitch axis 5. A more complete showing of the electrical circuit from the levels to the torquers is shown in the prior patent to Haskins, No. 2,446,180, dated April 3, 1948, for Gyroscope Controlling Means, while the preferred mechanical details of the torquers and transmitters on this type of gyro are shown in the British patent to the Sperry Gyroscope Company, assignee, No. 603,427, accepted June 16, 1948, for Gyro Instruments.

The high angle stops between the gyro and gimbal ring above-referred to may comprise fixed projections 31, 32 on the interior of the gimbal ring with which spring pins 33 on top of the gyro contact when the relative tilt between the gyro and the gimbal about the pitch axis approaches about 85 degrees. The theory of operation of such stops is given in the prior patent to Spencer Kellogg, II, No. 2,452,473, dated October 26, 1948, for Gyroscopic Flight Instruments.

Coming now to my improvement over the prior art, my auxiliary erection device comprises in simplest form a pendulum 35 pivoted on the fore-and-aft axis of the gyro or an axis parallel thereto. As shown, the pendulum is pivoted on a pin 37 extending through the gimbal 7. The pendulum is shown in the form of a substantially semi-circular bob 34 having flattened portions 36 on which are mounted insulated blocks 38 acting as stops. Normally, the pendulum exerts no torque on the gimbal even under the influence of acceleration forces due to turns, since it has no contact with the gimbal and such forces cannot cause the pendulum to swing out to an angle of 90 degrees or more. When, however, the relative inclination about the roll axis of the pendulum and gimbal exceeds the critical angle selected, usually about 90 degrees, one of blocks 38 will engage a stop 39 secured to the gimbal ring and extending within the same. At this point, therefore, the pendulum will be picked up and pendulosity imparted to the gimbal. As shown, the pin 39 is mounted in insulating piece 41 and is surrounded by a helical conducting spring 43 in an electric circuit with a warning indicator, such as a lamp 45 or with an automatic means to right the gyroscope at a rapid rate, as shown in Fig. 5. When, therefore, the pendulum contacts the spring, as shown in dotted lines at the left-hand side of Fig. 2, contact will be made between the spring 43 and the pin 39 to close a circuit to light the lamp and warn the aviator that the gyro indications cannot be relied on for the time being. Upon seeing this signal, the aviator could hasten recovery of the gyro by caging or bringing into action a stronger erector, if desired.

When the gyro is not running, the pendulum will always prevent the gimbal ring and gyro from getting upside down, i. e., these elements will be in a position in which the liquid level erector can act properly to erect the same when the power is turned on. The pendulum will also aid in erecting the gyroscope in case it is tumbled or dumped during flight. While this condition seldom arises in the type of gyro shown herein, it may under certain conditions; but with my invention I assure that the gyro will be brought back to the vertical in a reasonable time. With this type of gyro, as stated, the proper relationship between the gyro and the gimbal ring about the pitch axis can never be lost because of the high angle stops 31, 33. In case, however, the gimbal and gyro should be inclined more than 90 degrees about the roll axis during operation, the gyro will be erected by the following cycle of operations.

The pendulum will first be picked up by the gimbal and hence a torque will be exerted about the roll axis of the gimbal and to the gyro, causing rapid precession of the gyro about the pitch axis, until the 85 degree stops are struck, whereupon such precession is stopped and the pendulous gimbal will swing sufficiently to break contact with the pendulum and to bring into action both levels 15 and 17, so that the gyro will be erected from that point on in the usual manner.

In Fig. 4, I show a somewhat modified form in which the auxiliary pendulum 35' is pivoted to one side of the fore-and-aft axis 9 of the gimbal, the pendulum being shown as pivoted on a bracket 49 secured to the top of the gimbal and extending thereabove. The limiting stops in this instance are shown as provided by brackets 51, 51' extending from arm 49. This form of the invention has the advantage that it does not take up space between the gimbal and the gyro and hence the over-all dimensions of the gimbal are held to a minimum.

Figure 7:
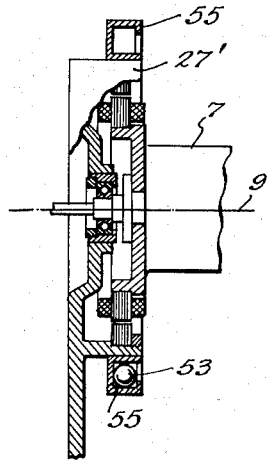
Fig. 7 is a vertical section of the same.
Figure 6:
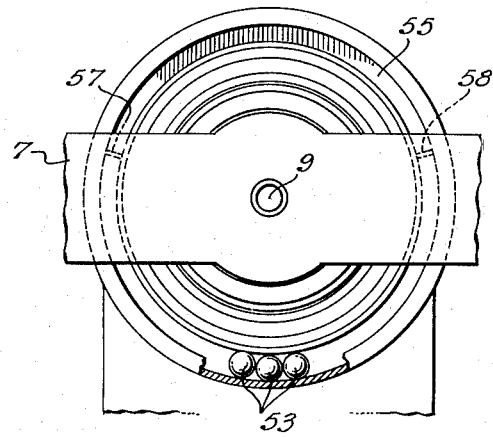
Fig. 6 is a sectional detail in elevation of a modified form of gravitational device which is an equivalent of the auxiliary pendulum of Fig. 1.
Figure 8:
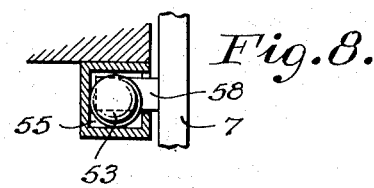
Fig. 8 is a detail partly in section of the same.

It is obvious that the gravitational element which is picked up by the gyro on excessive inclination need not be literally in the form of an ordinary pendulum, but may be in the nature of a liquid or other level device, which, of course, has the properties of a pendulum. Figs. 6, 7 and 8 have shown a gravitational element in the form of a freely rolling ball or balls 53 mounted in circular trackways 55 surrounding the major gimbal axis. Said trackway may be mounted on a fixed part such as the exterior of the appropriate torsion motor (27'). The gimbal ring 7 in such case has projections or paddles 57, 58 thereon, which projections enter through lateral annular slots in the trackway and engage the balls when the relative inclination of the gyro and airplane exceeds the limiting angle in either direction. Therefore, at this time the weight of the balls will be added to that of the ring making the ring pendulous and acting in the same manner as the pendulum 35 described in connection with Fig. 1. Obviously, a signal system such as shown in Fig. 1 may also be used in connection therewith if desired or a torquing system such as shown in Fig. 5 (hereinafter described).

Instead of, or in addition to, showing a warning light, when the pendulum or ball is picked up by the gimbal, as suggested in Fig. 2, I may go further and provide a means for quickly erecting the gyroscope from extreme tilts at this time, and hence shorten the time in which the gyroscope is ineffective as a gyro vertical reference. A simple method of performing this desirable function is shown diagrammatically in Fig. 5. In this Figure, the current supplied to the torquers is controlled not only from the liquid levels, but also from a timing relay so that the strength of the current is increased to give quicker erection for a predetermined interval after the pendulum is picked up, i. e., for a sufficiently long time to normally permit the gyro to reach a nearly vertical position. To this end, I have shown the switch 39 operated by the pendulum 35 as completing a circuit, or otherwise generating a signal, when closed through coil 61 of normally closed spring biased relay 63 and also through the coil 65 of normally open relay 67 from one side of a D. C. power supply to ground. Therefore, upon closing of contact 39, initially the switch 69 of relay 63 will be open but switches 71 and 73 and 78—83 of relay 67 will be closed. The closing of switch 71 completes a holding circuit through coil 65 and also through resistor 64 and thermostatically controlled switch 85. It also completes a circuit from a supply to switch 69 which remains open at the time because of the branch circuit through resistor 64, contacts 71 and coil 63. When the 85 degree stops 31, 33 are engaged, precession is stopped and the pendulum starts to right the gimbal 7, thereby opening contact 39 and permitting relay 69 to close, sending heating current to the heating coil 75 of thermostatically controlled timing element 77.

The closing of the relay 67 also increases the voltage supplied to at least one of the windings of both torquers 25 and 25' by transferring the supply switch contact 78 from an intermediate point 79 on Scott transformer 81 to the full supply voltage on the lower contact 83, thus increasing the torque applied to the gyro by both torquers. This will continue during a predetermined period, after which time the heat from the heating coil 75 will cause the opening of the thermostatic switch 85, thus permitting relay 67 to open and the torquing rate returned to normal.

I may also provide a warning indicator in this form of the invention, as in the form shown in Figs. 1 and 2. In this case, however, I prefer to connect the warning lamp 45' at a point such that the lamp will remain lighted as long as the increased current is being supplied to the torquers, so that the lamp will show that the gyro has not reached its proper position until normal current has been restored to the torquers. For this purpose, the lamp is shown as connected to a point in the supply beyond the relay switch 71 and the thermostatically controlled switch 85 so the lamp is lighted as soon as the contact 39 is made but not extinguished until the thermostatically controlled switch 85 opens.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A gyro vertical having normally effective gravitationally responsive controllers and erection torquers controlled thereby for erecting the gyro from normal tilts, an auxiliary normally ineffective gravitational element adjacent the major axis of the gimbal normally out of contact therewith, and means on said gimbal adapted to engage said element upon abnormal tilt of the gimbal to render the gimbal temporarily pendulous.

2. A gyro vertical as claimed in claim 1, in which high angle limit stops are provided about the minor axis of the gyro and between it and the gimbal ring, so that the gimbal, when pendulous, is brought back to level thereby.

3. A gyro vertical as claimed in claim 1, in which high angle limit stops are provided about the transverse axis of the gyro and between it and the gimbal ring.

4. A gyro vertical having normally effective gravitationally responsive controllers and erection torquers controlled thereby for erecting the gyro from normal tilts, an auxiliary pendulum pivoted adjacent the fore-and-aft axis of the gimbal normally out of contact therewith, and a stop on said gimbal adapted to engage the pendulum upon tilt of the gimbal approaching the roll angle at which the affected controller and torquer become ineffective.

5. A gyro vertical having normally effective gravitationally responsive controllers and erection torquers controlled thereby for erecting the gyro from normal tilts, an auxiliary gravitational element adjacent the major axis of the gimbal normally out of contact therewith, means on said gimbal adapted to engage said element upon abnormal tilt of the gimbal, and signal means operable upon engagement of said element and said gimbal.

6. A gyro vertical having normally effective gravitationally responsive controllers and erection torquers controlled thereby for erecting the gyro from normal tilts, an auxiliary pendulum pivoted adjacent the major axis of the gimbal normally out of contact therewith, a stop on said gimbal adapted to engage the pendulum upon abnormal tilt of the gimbal, means for temporarily increasing the torque exerted by said erection torquers, means brought into action by engagement of said pendulum with said gimbal for bringing said torque increasing means into action upon such engagement and means for maintaining said increased torque for a predetermined period after said pendulum is disengaged from said gimbal.

7. A gyro vertical having normally effective gravitationally responsive controllers and erection torquers controlled thereby for erecting the gyro from normal tilts, an auxiliary gravitational element adjacent the major axis of the gimbal normally out of contact therewith, means on said gimbal adapted to engage said second element upon abnormal tilt of the gimbal, signal means operable upon engagement of said element and said gimbal, and means initiated by said signal causing said torquers to increase their torque temporarily.

8. A gyro vertical for aircraft including a rotor case gimballed on said craft about a major roll axis and a minor pitch axis, said gimbal being free of stops about said roll axis, substantially 85 degrees limit stops about said pitch axis, gravitational controllers responsive to tilt of th gyro about each of said axes, torquers normally controlled thereby for exerting torques on said gyro at right angles to the tilt, and a normally ineffective but direct acting gravitational element acting about said roll axis to impart pendulosity to said gimbal upon tilt thereof beyond the range of effectiveness of the roll gravitational controller.

9. A gyro vertical for aircraft as claimed in claim 8, having means brought into action by the initiation of the effectiveness of said gravitational element for increasing for a limited period the strength of said torquers.

10. A gyro vertical as claimed in claim 9 also having a warning signal brought into action by said gravitational element, and means for continuing said warning for said limited period.

11. A gyro vertical as claimed in claim 7 having a warning device operated from said signal means coincident with said torque increasing means.

12. In a gyro vertical, a gimbal ring mounting the gyro for freedom about normally horizontal major and minor axes, normally effective gravitationally responsive means for erecting the gyro from normal tilts, an auxiliary normally ineffective gravitational element adjacent the major axis of the gimbal and normally out of contact therewith, and means on said gimbal adapted to engage said element upon abnormal tilt of the gimbal to render the same temporarily pendulous.

13. A gyro vertical as claimed in claim 12, in which high angle limit stops are provided about the minor axis of the gyro between it and the gimbal ring, so that the gimbal when made pendulous is brought back to level thereby, whether the gyro be running or not.

14. A gyro vertical for aircraft including a rotor case gimballed on said craft about a major roll axis and a minor pitch axis, said gimbal being free of stops about said roll axis, substantially 85 degree limit stops about said pitch axis, a gravitational controller responsive to tilt of the gyro about each of said axes adapted to exert erecting torques on said gyro at right angles to the tilt, and a normally ineffective but direct acting gravitational element acting about said roll axis to impart pendulosity to said gimbal upon tilt thereof beyond the range of effectiveness of the gravitational controllers.

15. A gyro vertical as claimed in claim 6 having a warning device, means for actuating the same upon engagement of said pendulum and gimbal, and means for maintaining it effective as long as the increased torque remains effective.

16. A gyro vertical as claimed in claim 7 having a warning device, and means for exciting the same coextensively with said torque increase.

References Cited in the file of this patent

UNITED STATES PATENTS

| Number | Name | Date |
| --- | --- | --- |
| 1,773,412 | Thompson | Aug. 19, 1930 |
| 2,369,131 | Braddon et al. | Feb. 13, 1945 |
| 2,380,538 | Meredith | July 31, 1945 |
| 2,452,473 | Kellogg | Oct. 26, 1948 |
| 2,524,553 | Wendt | Oct. 3, 1950 |
| 2,534,463 | MacCallum | Dec. 19, 1950 |